Jan. 29, 1957  M. P. HERSEY, JR  2,779,931

METHOD AND APPARATUS FOR MEASURING SPEED

Filed Feb. 8, 1954

INVENTOR.
MILLAR PAUL HERSEY

BY George H. Fisher

ATTORNEY 2,779,931

Patented Jan. 29, 1957

2,779,931

METHOD AND APPARATUS FOR MEASURING SPEED

Millar Paul Hersey, Jr., Seattle, Wash., assignor to Minneapolis-Honeywell Regulator Company, Minneapolis, Minn., a corporation of Delaware Application February 8, 1954, Serial No. 408,661

10 Claims. (Cl. 340—3)

This invention relates to the broad field of flow measurement, that is, measurement of relative movement between a solid body and an adjacent fluid. As a specific illustration of a practical embodiment, the invention is shown applied to measuring speed of a vessel relative to the water through which it moves, but obvious adaptations of the invention are apparent to render it useful in measuring the airspeed of a craft, or the flow of fluid in a pipe, for example.

It is an object of the invention to provide an improved method and apparatus for determining the relative movement between a solid body and an adjacent fluid.

Another object of the invention is to provide such apparatus using compressional wave energy directed transversely of the relative motion in question.

Another object of the invention is to provide an improved ship's log.

Another object of the invention is to provide apparatus in which sound is directed through a material fluid from a transmitting device to a reflector suitably spaced therefrom so as to set up standing waves in the medium which vary the load on the transmitting device in accordance with the distance between the device and point of reflection on the reflector: this distance changes with movement between the medium and the reflector when the movement has a component perpendicular to the normal path of the sound, and is thus a parameter of load on the transmitter.

Another object of the invention is to provide apparatus in which pulses of sound are directed transversely of the direction of relative movement between a fluid and a solid member, so that the length of the path of the sound varies with the relative movement, and measuring the interval of travel of the sound as a measure of the path length.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

In the drawing, Figure 1 is a front view of a marine vessel having a ship's log according to the invention;

Figure 1:
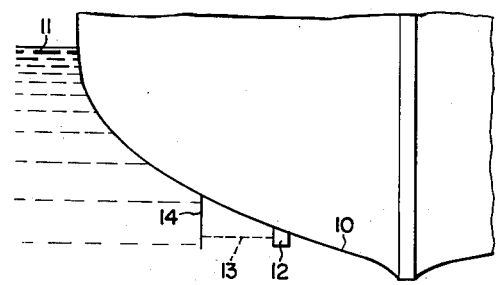

Figure 1 gives a fragmentary showing of a vessel 10 moving through a fluid 11 in a direction perpendicular to the plane of the drawing. A sound transmitter 12 is mounted on the vessel and directs the principal lobe of its output along a line 13 substantially perpendicular to the direction of motion of the craft to impinge upon a reflector 14, the arrangement being such that when the craft is motionless the sound from transmitter 12 is reflected back by the reflector 14 to impinge again on transmitter 12.

The operation of my invention must be distinguished from that of radar and other equipment using electromagnetic energy: such vibrations are transverse waves propagated in a hypothetical "ether," and the famous Michelson-Morley experiment conclusively showed them to be independent of any movement of source or receiver relative to the etheric medium. Sound on the other hand, being propagated by compressional waves in a material medium, is not thus independent.

Figure 2:
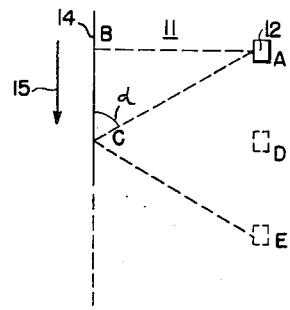
Figure 2 is a diagram illustrating the operation of the invention.

In Figure 2, device 12 is shown at point A. When the craft is not in motion the sound following the path AB perpendicular to reflector 14 returns to device 12, while sound following the path AC is reflected along the path CE and does not return to device 12. Specular reflection at reflector 14 is of course presumed. If the fluid medium between device 12 and reflector 14 moved with the craft, the same conditions would continue.

In practice there is relative movement between the water and the craft, the latter moving in the direction of arrow 15: device 12 and reflector 14 project sufficiently from the skin of the craft to be in contact with water relatively undisturbed by the craft's motion. In the interval required for sound to move through the distance AB, the device 12 has moved to a new position D, and by the time the sound returns to the initial position A of the device, the latter has reached a new position E.

On the other hand sound initially moving along some line AC making an angle with the direction of movement of the craft reaches member 14 when device 12 has reached position D, and upon reflection arrives at position E at the same time as device 12. This is the condition for operation of the apparatus described more specifically below, and occurs when the distance BC bears the same ratio to the distance AB as does the speed $V_c$ of the craft bear to the speed of sound $V_s$ when traversing the particular fluid medium. The distance ACE travelled by the sound in this case is greater than the distance ABA travelled when the craft is stationary, and this fact may be used in two different ways to get a measure of the distance BC and hence of the speed of the craft, as shown in Figures 3 and 4 respectively.

Figure 3:
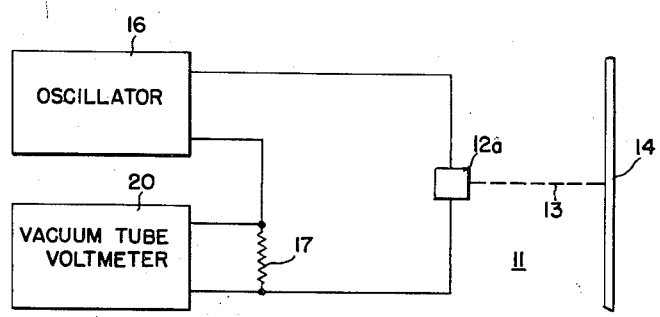
Figure 3 is a schematic diagram of one embodiment of the invention.
Figure 4:
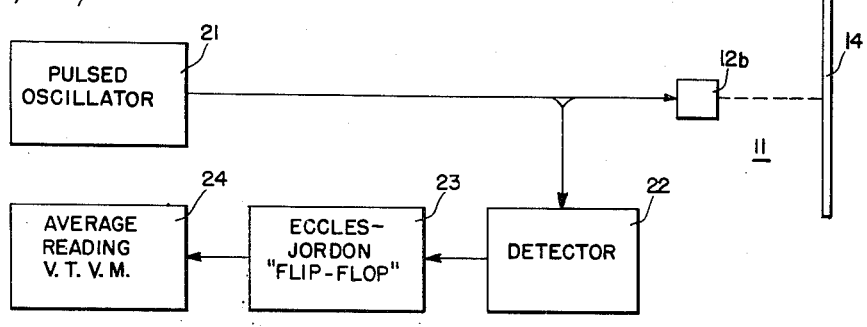
Figure 4 is a schematic diagram of another embodiment of the invention.

In Figure 3, device 12 is shown as a transducer 12a converting electrical energy from an oscillator 16 to sound energy coupled to fluid 11 in any known fashion. A resistor 17 is connected in series with transducer 12a, and a vacuum tube voltmeter 20 is connected to measure the voltage drop in resistor 17.

In this embodiment of the invention the frequency of oscillator 16 is so selected that the distance AB of Figure 2 is made very nearly an even multiple of half the wave length of the sound emitted by transducer 12a. If the desired length is exactly achieved, and the craft is stationary, standing waves of sound appear between transducer 12a and reflector 14, sound reflected from reflector 14 to transducer 12a being exactly in phase or 180° out of phase with the sound being emitted, thus preventing a minimum or a maximum load to the transducer. For this condition the vacuum tube voltmeter gives the minimum or "zero" indication.

As the craft begins to move relative to the water the path length for the sound increases: the reflected sound is no longer entirely in phase or 180° out of phase with the transmitted sound, and the load on the transducer increases or decreases and is indicated at 20.

Figure 4 shows a second modification of the invention, using pulsed rather than continuous energization. In this figure a pulsed oscillator 21 energizes transducer 12b, which is arranged not only to transmit but to receive sound energy coupled from fluid 11. A detector 22 is also connected to oscillator 21 and transducer 12b, and its output controls the operation of an Eccles-Jordan "flip-flop" circuit 23 to which is connected an average reading vacuum tube voltmeter 24. Members 21, 22, 23 and 24 are individually known and will not be structurally described in detail.

When a pulse of energy is supplied by oscillator 21 it is transmitted from transducer 12b and simultaneously acts through detector 22 to establish a first energy state in the Eccles-Jordan circuit. The sound is reflected at reflector 14 and returns to transducer 12b, where it is converted to an electrical pulse which also acts through detector 22 on circuit 23 to establish the second energy state thereof. The pulse repetition frequency of oscillator 21 is so chosen with respect to the distance ABA that when the craft is stationary the flip-flop circuit is in its two energy states for equal intervals of time, and meter 24 gives a "zero" indication.

As the craft begins to move relative to the water the path length of the sound increases, delaying the received pulse so that the intervals during which the two states of the flip-flop circuit prevail are no longer equal, and the inequality is indicated by meter 24.

It is appreciated that the speed of the craft is small compared to the speed of sound in water, and the angle $\alpha$ in Figure 2 is greatly exaggerated. Nonetheless phase and time-interval measuring techniques have developed to the point where no practical difficulty is encountered, in the practice of the invention, in reading craft speeds as low as 1 knot, or 1.7 feet per second.

Numerous objects and advantages of my invention have been set forth in the foregoing description, together with details of the structure and function of the invention, and the novel features thereof are pointed out in the appended claims. The disclosure however, is illustrative only, and I may make changes in detail within the principle of the invention to the full extent indicated by the broad general meaning of the terms in which the appended claims are expressed.

I claim as my invention:

1. Apparatus for measuring the relative speed of a material fluid and an adjacent member comprising, in combination: sound projecting and receiving means on said member; a reflecting surface on said member separated from said projecting and receiving means by a body of said fluid and positioned for impingement by sound from said projecting means so as to reflect said sound to said receiving means; and means connected to said receiving means for measuring a quantity which varies with the length of the path travelled by said sound as a parameter of the desired relative speed.

2. Apparatus of the class described comprising, in combination: a member having a sound reflecting surface; a sound emitting and receiving device; means mounting said member and said device in unitary, spaced relationship so that when the space therebetween is occupied by a material fluid sound emitted by said device may be conducted to said member, reflected at said surface, and reconducted to said device, the path of the sound being of a length which varies with the variation in the component, aligned with said surface, of any relative movement between said member and the fluid; means intermittently energizing said device to emit pulses of sound separated by intervals during which no sound is emitted and during which sound reflected from said surface may be measured; circuit means connected to said device and having first and second energy states, including means establishing one of said states each time a pulse is transmitted and means establishing the other of said states each time a pulse is received so that the average energy of said circuit means varies with the length of said path; and means giving an output in accordance with said average energy.

3. Apparatus of the class described comprising, in combination: a member having a sound reflecting surface; a sound emitting and receiving device; means mounting said member and said device in unitary, spaced relationship so that when the space therebetween is occupied by a material fluid sound emitted by said device may be conducted to said member, reflected at said surface, and reconducted to said device, the path of the sound being of a length which varies with variation in the component, aligned with said surface, of any relative movement between said member and the fluid; means intermittently energizing said device to emit pulses of sound separated by intervals during which no sound is emitted and during which sound reflected from said surface may be received; and means connected to said device for giving an output which varies with the interval between the emission of a pulse of sound and its subsequent reception after reflection, which interval varies with the length of said path.

4. Apparatus of the class described comprising, in combination: a member having a sound reflecting surface; a sound emitting device; means mounting said member and said device in unitary, spaced relationship so that when the space therebetween is occupied by a material fluid sound emitted by said device may be conducted to said member, reflected at said surface, and reconducted to said device, the path of the sound being of a length which varies with variation in the component, aligned with said surface, of any relative movement between said member and the fluid; means continuously energizing said device to emit sound having half a wave length in the medium which is substantially an integral submultiple of the minimum length of said path; whereby standing sound waves may be produced in the medium to determine the load on said device, said load varying with the length of said path; and means connected to said device for giving an output varying with variation in said load.

5. Apparatus of the class described comprising, in combination: a member having a sound reflecting surface; a sound emitting device having a directivity pattern with a principal lobe; means mounting said member and said device in unitary, spaced relationship with said principal lobe directed toward said surface so that when the space therebetween is occupied by a material fluid sound emitted by said device may be conducted to said member, reflected at said surface, and reconducted to said device, the path of the sound being of a length which varies with variation in the component, aligned with said surface, of any relative movement between said member and the fluid; and further means connected to said device for giving an output determined by the length of said path.

6. Apparatus of the class described comprising, in combination: a member having a sound reflecting surface; a sound emitting device; means mounting said member and said device in unitary, spaced relationship so that when the space therebetween is occupied by a material fluid sound emitted by said device may be conducted to said member, reflected at said surface, and reconducted to said device, the path of the sound being of a length which varies with variation in the component, aligned with said surface, of any relative movement between said member and the fluid; and further means connected to said device for giving an output determined by the length of said path.

7. Apparatus of the class described comprising, in combination: a member having an energy reflecting surface; an energy emitting device; means connected to said device for causing said device to emit energy capable of conduction in a material fluid and of reflection at said surface; means mounting said member and said device in unitary, spaced relationship so that when the space therebetween is occupied by such a material fluid, energy emitted by said device may be conducted to said member, reflected at said surface, and reconducted to said device, the path of said energy being of a length which varies with variation in the component aligned with said surface, of any relative movement between said member and the fluid; and further means connected to said device for giving an output determined by the length of said path.

8. Apparatus of the class described comprising, in combination: a vessel longitudinally moveable in a sound conducting medium; a longitudinally extending sound reflecting member carried by said vessel; a sound emitting and receiving transducer having a directivity pattern with a principal lobe; means mounting said transducer on said vessel so that the axis of said principal lobe extends to said member, when said craft is stationary, to define a path of known length for sound energy emitted by said transducer and reflected thereto; means energizing said transmitter to emit sound energy; and means connected to said transducer and influenced as a result of reflection of said energy to give an output which varies with increase in the length of said path resulting from longitudinal movement of the craft.

9. Apparatus of the class described comprising, in combination: a vessel moveable in a medium; an energy reflecting member carried by said vessel and extending in alignment with a selected direction of relative movement between said vessel and said medium; energy transducing means carried by said vessel for directing toward said member energy capable of conduction by said medium and reflection by said member, and for receiving such energy after reflection by said member; and means connected to said transducing means for giving an output which varies with the difference between the time required for energy emitted by said transducer to be received, after reflection by said member, when said craft has no component of movement parallel to said member, and the similar time when said craft has such a component of movement.

10. Apparatus for indicating the speed of a craft through a sound conducting medium comprising, in combination: a sound emitting device having a directivity pattern with a principal lobe; means mounting said device so that said lobe is directed transversely of the craft; a sound reflecting member extending longitudinally of said craft at a location spaced laterally from said device, the space therebetween being arranged to be occupied by the medium; means energizing said device to cause sound to travel in a path between said device and said member, the length of said path varying with the speed of the craft; and means connected to said device for giving an output which varies with the length of said path.

References Cited in the file of this patent

UNITED STATES PATENTS

| | | |
|---|---|---|
| 1,864,638 | Chilowsky | June 28, 1932 |
| 1,985,251 | Hayes | Dec. 25, 1934 |
| 2,480,646 | Grabau | Aug. 30, 1949 |
| 2,515,221 | Henning | July 18, 1950 |